United States Patent
Skurkis et al.

(10) Patent No.: US 10,260,958 B2
(45) Date of Patent: Apr. 16, 2019

(54) RESETTABLE SENSOR ASSEMBLY AND SYSTEM

(71) Applicant: GM GLOBAL TECHNOLOGY OPERATIONS LLC, Detroit, MI (US)

(72) Inventors: Richard J. Skurkis, Lake Orion, MI (US); Nancy L. Johnson, Northville, MI (US); Paul W. Alexander, Ypsilanti, MI (US); Dorel M. Sala, Troy, MI (US); Nicholas W. Pinto, IV, Shelby Township, MI (US); Xiujie Gao, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 384 days.

(21) Appl. No.: 15/134,544

(22) Filed: Apr. 21, 2016

(65) Prior Publication Data

US 2016/0313189 A1    Oct. 27, 2016

Related U.S. Application Data

(60) Provisional application No. 62/151,192, filed on Apr. 22, 2015.

(51) Int. Cl.
*G01K 5/48* (2006.01)
*H01H 37/00* (2006.01)

(52) U.S. Cl.
CPC ............. *G01K 5/483* (2013.01); *H01H 37/00* (2013.01)

(58) Field of Classification Search
CPC .................................. G01K 5/483; H01H 37/00
See application file for complete search history.

(56) References Cited

U.S. PATENT DOCUMENTS

| | | | | |
|---|---|---|---|---|
| 4,191,053 A | * | 3/1980 | Hart | G01K 5/483 374/112 |
| 5,014,036 A | * | 5/1991 | Komoto | H01H 9/102 337/4 |
| 2004/0067122 A1 | * | 4/2004 | Post | F16B 1/0014 411/383 |

(Continued)

FOREIGN PATENT DOCUMENTS

| CN | 102121462 A | 7/2001 |
|---|---|---|
| CN | 102195272 A | 9/2011 |

(Continued)

*Primary Examiner* — Justin Seo
*Assistant Examiner* — John M Royston
(74) *Attorney, Agent, or Firm* — Quinn IP Law (57) ABSTRACT

A resettable sensor assembly includes a body having a axis and defining a cavity therein. The body includes a first plurality of threads disposed about the axis. The assembly includes a housing mated to the body and including at least one electrical contact. The assembly further includes a plate. The assembly also includes an actuator element configured for translating the plate along the axis between a first position in which the plate contacts the at least one electrical contact and a second position in which the plate is spaced apart from the at least one electrical contact. The element is formed from a shape memory alloy that is transitionable between an austenite crystallographic phase and a martensite crystallographic phase in response to a thermal activation signal to thereby translate the plate between the first position and the second position.

20 Claims, 5 Drawing Sheets

(56) References Cited

U.S. PATENT DOCUMENTS

| | | | |
|---|---|---|---|
| 2007/0175447 A1* | 8/2007 | Begg | F02D 41/34 123/441 |
| 2007/0262721 A1* | 11/2007 | Camilli | H01T 13/40 315/32 |
| 2013/0133613 A1* | 5/2013 | Domit | F02B 53/04 123/210 |

FOREIGN PATENT DOCUMENTS

| | | | |
|---|---|---|---|
| FR | 2407550 A1 | 5/1979 | |
| JP | 63262531 A | 10/1988 | |

* cited by examiner

RESETTABLE SENSOR ASSEMBLY AND SYSTEM

CROSS-REFERENCE TO RELATED APPLICATIONS

This application claims the benefit of U.S. Provisional Application No. 62/151,192, filed on Apr. 22, 2015, which is hereby incorporated by reference in its entirety.

TECHNICAL FIELD

The disclosure relates to a resettable sensor assembly and a resettable sensor system.

BACKGROUND

Manufacturing equipment, vehicles, and many types of devices are often subject to temperature changes during operation. For example, manufacturing operations may include heating equipment such as ovens, dryers, grinders, and the like that may repeatedly cycle between temperature extremes. Likewise, vehicles such as automobiles, railcars, aircraft, and earth movers may include one or more components, such as gear boxes, brakes, fluid containers, axles, and bearings, that may be subjected to varying temperatures during operation. Similarly, electrically-powered equipment, such as electric motors, timer switches, welding transformers, and welding guns; and mechanical equipment such as pulleys, elevators, and augers may be subject to frictional heating during operation. Processing equipment such as reactors, ovens, coolant pipes, conduits, valves, and conveyors may likewise operate in varying environmental and thermal conditions.

Such equipment, vehicles, and devices may be expected to operate with minimal operator attention or oversight. For example, devices may be shrouded by shields or casings during operation, and equipment may be located where physical and/or visual access is limited.

SUMMARY

A resettable sensor assembly includes a body having a longitudinal axis and defining a cavity therein. The body includes a plurality of threads disposed about the longitudinal axis. The resettable sensor assembly also includes a housing mated to the body and including at least one electrical contact, and a plate disposable in contact with the at least one electrical contact. The resettable sensor assembly also includes an actuator element configured for translating the plate along the longitudinal axis between a first position in which the plate contacts the at least one electrical contact, and a second position in which the plate is spaced apart from the at least one electrical contact. The actuator element is formed from a shape memory alloy that is transitionable between an austenite crystallographic phase and a martensite crystallographic phase in response to a thermal activation signal to thereby translate the plate between the first position and the second position.

In one embodiment, the resettable sensor assembly includes a shuttle reversibly translatable within the cavity along the longitudinal axis. The actuator element is disposed in contact with and about the shuttle along the longitudinal axis, and is formed from a shape memory alloy that is transitionable between an austenite crystallographic phase and a martensite crystallographic phase in response to a thermal activation signal to thereby translate the shuttle between the first position and the second position.

A resettable sensor system includes a resettable sensor assembly. The resettable sensor assembly includes a body having a longitudinal axis and defining a cavity therein. The body includes a plurality of threads disposed about the longitudinal axis. The resettable sensor assembly also includes a housing mated to the body and including at least one electrical contact, and a plate disposable in contact with the at least one electrical contact. The resettable sensor assembly also includes an actuator element configured for translating the plate along the longitudinal axis between a first position in which the plate contacts the at least one electrical contact, and a second position in which the plate is spaced apart from the at least one electrical contact. The actuator element is formed from a shape memory alloy that is transitionable between an austenite crystallographic phase and a martensite crystallographic phase in response to a thermal activation signal to thereby translate the plate between the first position and the second position. The resettable sensor system also includes a member configured for providing the thermal activation signal to the actuator element. The member defines a hole therein and includes a second plurality of threads matable with the first plurality of threads to thereby seat the resettable sensor assembly within the hole.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Referring to the Figures, wherein like reference numerals refer to like elements, a resettable sensor assembly 10, 110, 210, 310, 410 and resettable sensor system 12 (FIG. 8) are shown. The resettable sensor assembly 10, 110, 210, 310, 410 and resettable sensor system 12 operate passively, i.e., in response to temperature changes and without an additional electrical power source, and are useful for alerting an operator to a condition in which a temperature of a member 22 (FIG. 8), device, or fluid falls outside of a desired temperature range. The resettable sensor assembly 10, 110, 210, 310, 410 and resettable sensor system 12 are automatically resettable once the condition has ended, i.e., once the temperature of the device or fluid again returns to within the desired temperature range. Therefore, the resettable sensor assembly 10, 110, 210, 310, 410 and resettable sensor system 12 may be useful for temperature monitoring for manufacturing and vehicle applications. For example, the resettable sensor assembly 10 and resettable sensor system 12 may be useful for vehicle applications such as oil temperature monitoring, coolant temperature monitoring, transmission temperature monitoring, axle fluid temperature monitoring, brake caliper fluid monitoring, and the like. However, the resettable sensor assembly 10 and resettable sensor system 12 may also be useful for non-vehicular temperature monitoring applications such as heating equipment, e.g., ovens, dryers, and grinders, that may repeatedly cycle between temperature extremes; electrically-powered equipment, e.g., electric motors, timer switches, welding transformers, and welding guns, that may be subjected to varying temperatures during operation; mechanical equipment, e.g., pulleys, elevators, and augers that may be subject to frictional heating during operation; and processing equipment, e.g., reactors, ovens, coolant pipes, conduits, valves, and conveyors that may likewise operate in varying environmental and thermal conditions.

Figure 1:
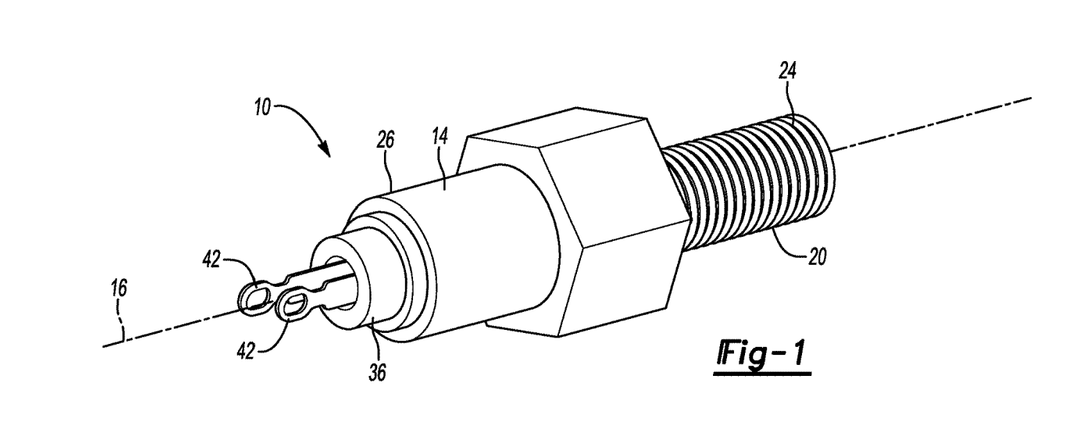
FIG. 1 is a schematic illustration of a perspective view of a resettable sensor assembly.
Figure 4:
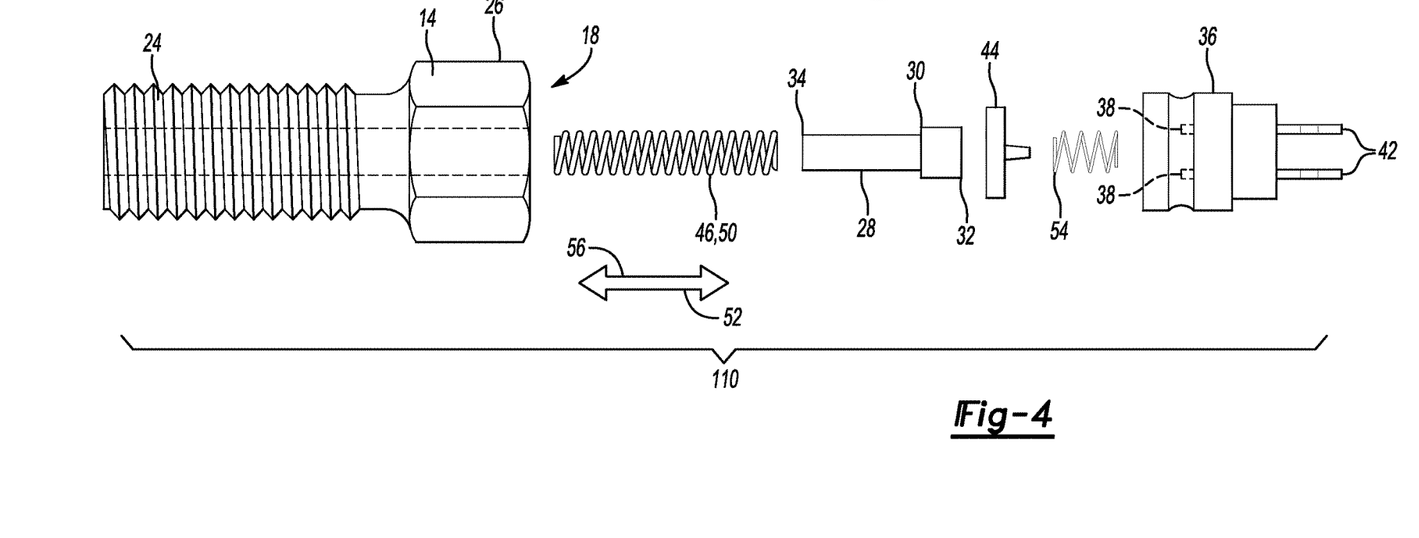
FIG. 4 is a schematic illustration of an exploded view of another embodiment of the resettable sensor assembly of FIGS. 1-3.
Figure 8:
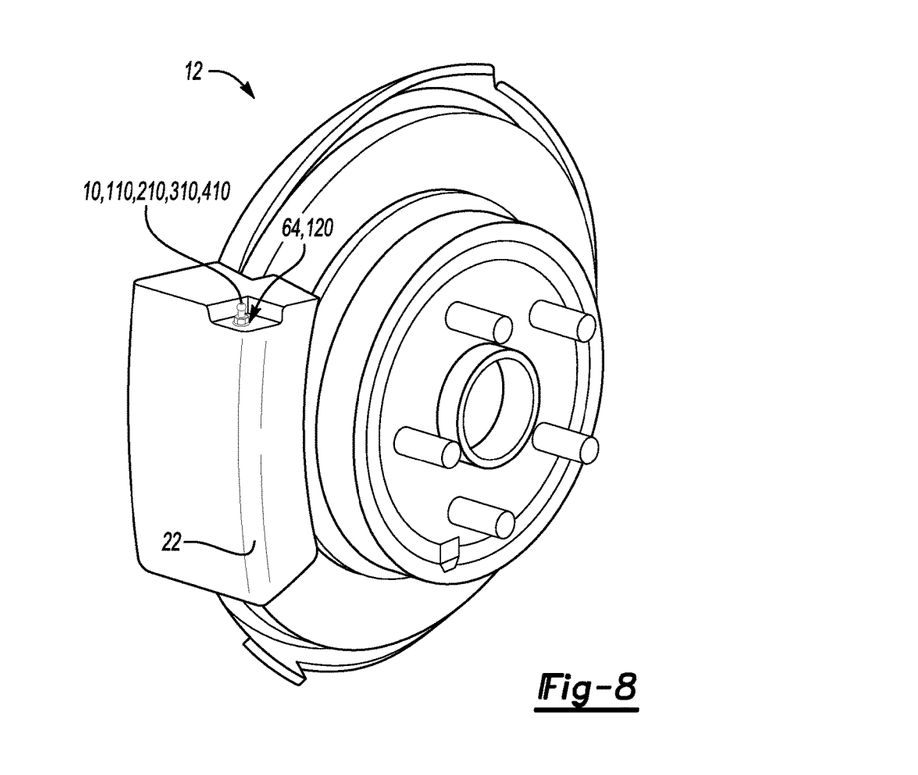
FIG. 8 is a schematic illustration of a perspective view of a resettable sensor system.

Referring to FIG. 1, the resettable sensor assembly 10 includes a body 14 having a longitudinal axis 16. The body 14 defines a cavity 18 (FIGS. 2, 4, and 6) therein and includes a first plurality of threads 20 disposed about the longitudinal axis 16. The body 14 may be formed from a thermally-conductive material, such as a metal, e.g., brass or copper, according to the operating conditions of the resettable sensor assembly 10. The first plurality of threads 20 may form a screw such that the body 14 may threadably attach to the member 22 (FIG. 8). The body 14 may have a generally cylindrical shape and may protect other components of the resettable sensor assembly 10 from contaminants during operation. The body 14 may have a proximal end 24 and a distal end 26 spaced apart from the proximal end 24 along the longitudinal axis 16.

Figure 9:
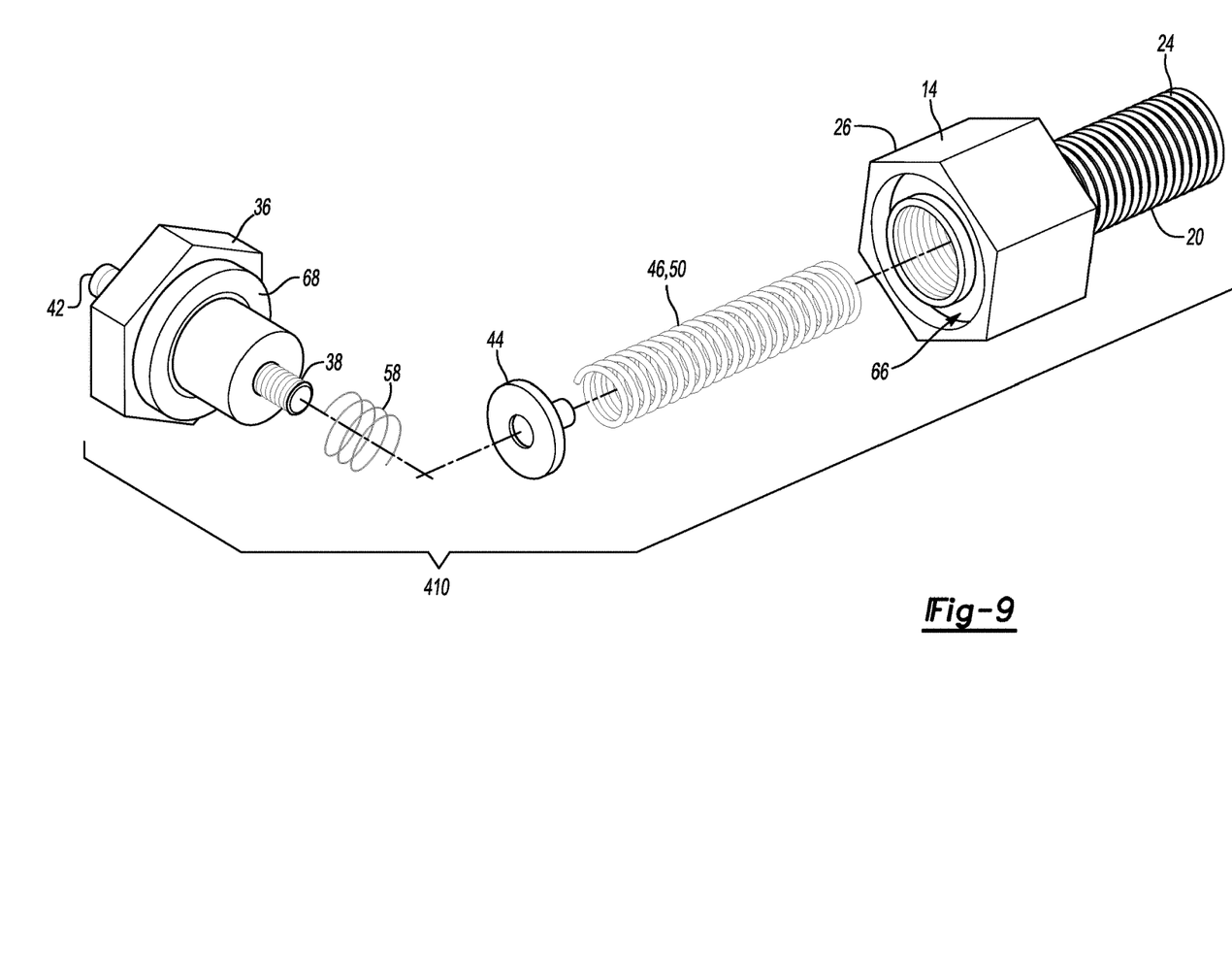
FIG. 9 is a schematic illustration of an exploded view of an additional embodiment of the resettable sensor assembly of FIGS. 1-7.

As best shown in FIG. 9, the cavity 18 may be configured for containing a fluid (not shown) such as an oil-based fluid, a coolant, ambient air, and the like. For example, the fluid may be an oil-based transmission fluid. The fluid may enhance or decrease heat transfer to various components of the resettable sensor assembly 410, as set forth in more detail below. By way of a non-limiting example, for this embodiment, the body 14 may define a channel 66 therein. The channel 66 may be configured to receive a seal 68, such as an O-ring formed from an elastomeric material, and may be generally annular or may have another desired shape or configuration.

Figure 2:
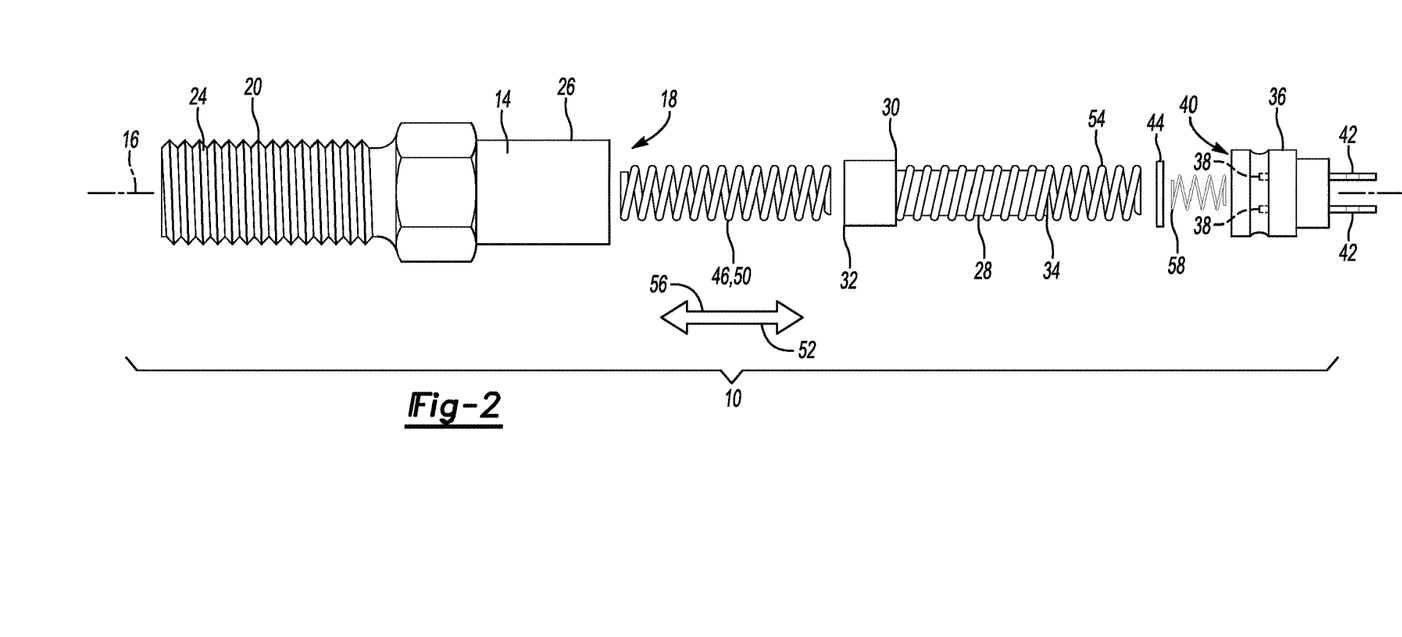
FIG. 2 is a schematic illustration of an exploded view of the resettable sensor assembly of FIG. 2.

Referring now to FIG. 2, the resettable sensor assembly 10 may also include a shuttle 28 reversibly translatable within the cavity 18 along the longitudinal axis 16. The shuttle 28 may be formed from a lightweight and non-conductive material such as a plastic or a composite. The shuttle 28 may have a generally cylindrical shape and may form a shoulder 30 at a first end 32 such that the first end 32 has a larger diameter than a second end 34 of the shuttle 28. During operation, the shuttle 28 may slide back and forth within the cavity 18, as set forth in more detail below.

Figure 3:
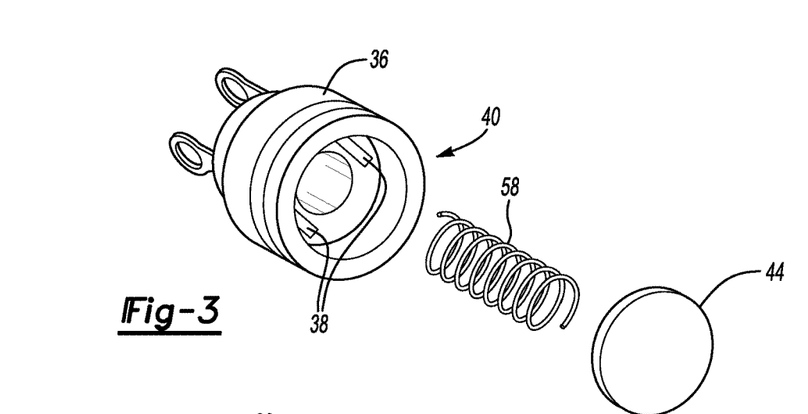
FIG. 3 is a schematic illustration of an exploded, end view of a housing, a bias resilient member, and a plate of the resettable sensor assembly of FIGS. 1 and 2.

With continued reference to FIG. 2, the resettable sensor assembly 10 further includes a housing 36 mated to the body 14 and including at least one electrical contact 38 (FIG. 3). That is, the housing 36 may be characterized as an electrical switch which may form a portion of an electrical circuit. The housing 36 may be a normally-open electrical switch in which a default state of the housing 36 is such that electrical current may not pass through the at least one electrical contact 38 to complete an electrical circuit. Alternatively, the housing 36 may be a normally-closed electrical switch in which a default state of the housing 36 is such that electrical current may pass through the at least one electrical contact 38 to complete an electrical circuit.

Figure 5:
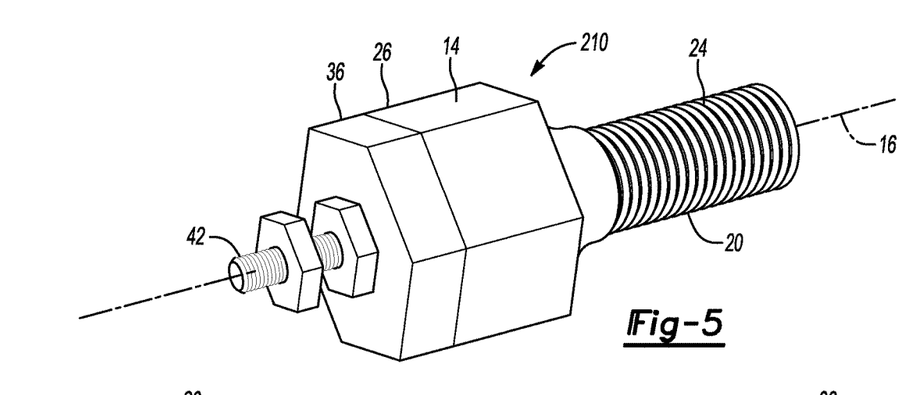
FIG. 5 is a schematic illustration of a perspective view of a further embodiment of the resettable sensor assembly of FIGS. 1-4.
Figure 6:
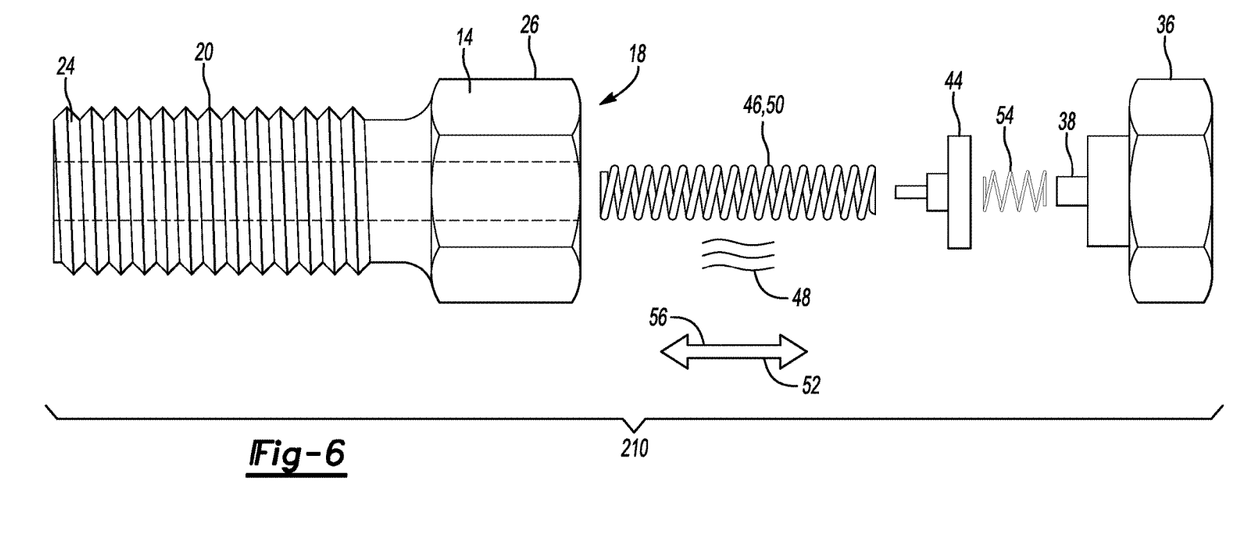
FIG. 6 is a schematic illustration of an exploded view of the resettable sensor assembly of FIG. 5.

As best described with reference to FIG. 3, the housing 36 may define a chamber 40 therein and the at least one electrical contact 38 may be disposed within the chamber 40. The at least one electrical contact 38 may form or be disposed in electrical communication with a terminal 42 (FIG. 2), which may in turn connect to a transmission wire (not shown), flag (not shown), and/or processor (not shown). In one embodiment, as shown in FIGS. 5 and 6, the housing 36 may include only one electrical contact 38 that is configured for connecting to one transmission wire at the terminal 42. In another embodiment, as shown in FIGS. 1-4, the housing 36 may include a plurality of electrical contacts 38, e.g., two electrical contacts 38, spaced apart from one another. That is, the plurality of electrical contacts 38 may be disposed within the chamber 40.

Referring again to FIG. 2, the resettable sensor assembly 10 also includes a plate 44 disposable in contact with the at least one electrical contact 38. The plate 44 may be shaped as a disc and may be formed from an electrically-conductive material such as brass or copper.

The resettable sensor assembly 10 also includes an actuator element 46 configured for translating the plate 44, e.g., via the shuttle 28, along the longitudinal axis 16 between a first position in which the plate 44 contacts the at least one electrical contact 38, and a second position in which the plate 44 is spaced apart from the at least one electrical contact 38. For embodiments in which the housing 36 includes the plurality of electrical contacts 38, the plate 44 is disposed in contact with the plurality of electrical contacts 38, when the shuttle 28 is disposed in the first position, and is spaced apart from the plurality of electrical contacts 38, when the shuttle 28 is disposed in the second position.

The actuator element 46 is formed from a shape memory alloy that is transitionable between an austenite crystallographic phase and a martensite crystallographic phase in response to a thermal activation signal 48 (FIG. 6) to thereby translate the shuttle 28 and/or the plate 44 between the first position and the second position.

The shape memory alloy is transitionable in response to the thermal activation signal 48 between a first temperature-dependent state and a second temperature-dependent state. In particular, the actuator element 46 may be configured as a first resilient member 50 and may abut the shuttle 28 and the body 14. Therefore, as set forth in more detail below, the actuator element 46 may actuate or translate the shuttle 28 and/or the plate 44 by transitioning between the first temperature-dependent state and the second temperature-dependent state such that the shuttle 28 and/or the plate 44 slide along the longitudinal axis 16 within the cavity 18.

As used herein, the terminology "shape memory alloy" refers to alloys that exhibit a shape memory effect and have the capability to quickly change properties in terms of stiffness, spring rate, and/or form stability. That is, the shape memory alloy may undergo a solid state crystallographic phase change via molecular or crystalline rearrangement to shift between the martensite crystallographic phase, i.e., "martensite", and the austenite crystallographic phase, i.e., "austenite". Stated differently, the shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the shape memory alloy begins to change from the austenite crystallographic phase to the martensite crystallographic phase is known as the martensite start temperature, $M_s$. The temperature at which the shape memory alloy completes the change from the austenite crystallographic phase to the martensite crystallographic phase is known as the martensite finish temperature, $M_f$. Similarly, as the shape memory alloy is heated, the temperature at which the shape memory alloy begins to change from the martensite crystallographic phase to the austenite crystallographic phase is known as the austenite start temperature, $A_s$. The temperature at which the shape memory alloy completes the change from the martensite crystallographic phase to the austenite crystallographic phase is known as the austenite finish temperature, $A_f$.

The shape memory alloy may have any suitable form, i.e., shape. For example, the actuator element 46 may be configured as a shape-changing element such as a wire (not shown), spring (FIGS. 2, 4, and 6), tape, band, continuous loop, and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy can be binary, ternary, or any higher order so long as the shape memory alloy exhibits a shape memory effect, e.g., a change in shape orientation, damping capacity, and the like. Generally, the shape memory alloy may be selected according to desired operating temperatures of the resettable sensor assembly 10. In one specific example, the shape memory alloy may include nickel and titanium.

Therefore, the actuator element 46 formed from the shape memory alloy may be characterized by a cold state, i.e., when a temperature of the shape memory alloy is below the martensite finish temperature, $M_f$, of the shape memory alloy. Likewise, the actuator element 46 formed from the shape memory alloy may also be characterized by a hot state, i.e., when the temperature of the shape memory alloy is above the austenite finish temperature, $A_f$, of the shape memory alloy. In addition, although not shown, the resettable sensor assembly 10, 110, 210, 310, 410 may include a plurality of actuator elements 46 formed from the shape memory alloy. The number of actuator elements 46 may be selected according to a desired stability of the resettable sensor assembly 10, 110, 210, 310, 410 and/or a force required to translate the shuttle 28 and/or the plate 44. Further, for the embodiment of the resettable sensor assembly 410 depicted in FIG. 9, the fluid (not shown) may be retained within the cavity 18 by the seal 68 and may modify heat transfer to the actuator element 46, e.g., may increase or amplify the magnitude of the thermal activation signal 48, such that the actuator element 46 may change shape and/or stiffness more quickly. Conversely, the fluid may decrease the magnitude of the thermal activation signal 48 such that the actuator element 46 may change shape and/or stiffness more slowly or according to a desired schedule.

The actuator element 46 may contract in length and/or compress in response to the thermal activation signal 48 to translate the shuttle 28 and/or the plate 44 along the longitudinal axis 16 in a first direction 52 as the actuator element 46 transitions from the austenite crystallographic phase to the martensite crystallographic phase. That is, the actuator element 46 may push on the shuttle 28 and/or the plate 44 so that the shuttle 28 and/or the plate 44 slides along the longitudinal axis 16 towards the housing 36.

Referring again to FIG. 2, the resettable sensor assembly 10 may further include a second resilient member 54 disposed about and in contact with the shuttle 28. That is, the second resilient member 54 may be a bias spring and may wrap around the second end 34 of the shuttle 28. More specifically, the second resilient member 54 may translate the shuttle 28 along the longitudinal axis 16 in a second direction 56 that is opposite the first direction 52 as the actuator element 46 transitions from the martensite crystallographic phase to the austenite crystallographic phase. Therefore, as the shape memory alloy cools, the second resilient member 54 may push the shuttle 28 in the second direction 56, e.g., away from the housing 36, to thereby reset the resettable sensor assembly 10 to an initial or default position.

Therefore, referring again to FIGS. 2, 4, and 6, the shape memory alloy may be selected to change shape and/or stiffness at a specific transformation temperature, $T_{trans}$. For example, the transformation temperature may be selected to correspond to a suitable operating temperature range of the device or member 22 (FIG. 8) for which the resettable sensor assembly 10 measures or monitors temperature excursions that fall outside, i.e., above or below, a desired operating temperature range.

For example, as the actuator element 46 transitions from the austenite crystallographic phase to the martensite crystallographic phase, i.e., as the shape memory alloy cools from an excursion temperature that is greater than the transformation temperature to a temperature that is lower than the transformation temperature, the actuator element 46 may expand and push against the shuttle 28 and/or the plate 44 such that the shuttle 28 and/or the plate 44 translates along the longitudinal axis 16 towards the housing 36. As the shuttle 28 and/or the plate 44 translate, the shuttle 28 and/or the plate 44 may also compress the second resilient member 54 such that the plate 44 contacts the at least one electrical contact 38. Depending upon whether the housing 36 is configured as a normally-open or a normally-closed electrical switch, the plate 44 may complete or disrupt an electrical circuit so that an output signal (not shown) is transmitted through the terminal 42 to an output signal such as a visual signal, e.g., a flag or a color change on a indicator; an auditory signal, e.g., an alarm bell; or a combination thereof.

For example, when the housing 36 is configured as a normally-open electrical switch, the electrical circuit may close when the shape memory alloy is heated to a temperature above the transformation temperature so that an indicator signal is presented to an operator. Alternatively, when the housing 36 is configured as a normally-closed electrical switch, the electrical circuit may open when the shape memory alloy is heated to a temperature above the transformation temperature so that an indicator signal is no longer presented to an operator.

For example, during operation of the resettable sensor assembly 10, 110, once the operating temperature of the member 22 has warmed to a temperature at or greater than the transformation temperature, i.e., as the actuator element 46 transitions from the martensite crystallographic phase to the austenite crystallographic phase, the actuator element 46 may contract such that the second resilient member 54 overcomes the spring force of the first resilient member 50 and pushes against the shoulder 30 of the shuttle 28 to thereby translate the shuttle 28 in the second direction 56, i.e., away from the housing 36. As such, the plate 44 also translates away from the at least one electrical contact 38 such that the electrical circuit is interrupted or opened to thereby reset the housing 36 to the open state.

Referring again to FIGS. 2 and 3, the resettable sensor assembly 10, 110 may further include a bias resilient member 58 disposed within the chamber 40 of the housing 36 and configured for translating the plate 44 away from the at least one electrical contact 38 or the plurality of electrical contacts 38 along the longitudinal axis 16. That is, the bias resilient member 58 may augment the spring force of the second resilient member 54 and assist in moving the plate 44 away from the at least one electrical contact 38 as the shape memory alloy heats from the martensite crystallographic phase to the austenite crystallographic phase.

Conversely, the resettable sensor assembly 10, 110 may be arranged in an opposite configuration. For example, as the actuator element 46 transitions from the austenite crystallographic phase to the martensite crystallographic phase, i.e., as the shape memory alloy cools to an excursion temperature that is lower than the transformation temperature, the actuator element 46 may expand and push against the shuttle 28 and/or the plate 44 such that the shuttle 28 and/or the plate 44 translate along the longitudinal axis 16 towards the housing 36. As the shuttle 28 and/or the plate 44 translate, the shuttle 28 and/or the plate 44 may also expand the second resilient member 54 such that the plate 44 contacts the at least one electrical contact 38 to close the electrical circuit.

Referring now to FIG. 6, for embodiments of the resettable sensor assembly 210 which do not include the shuttle 28, the actuator element 46 may act directly on the plate 44, i.e., may translate the plate 44 in the first direction 52 along the longitudinal axis 16 as the shape memory alloy transitions from the austenite crystallographic phase to the martensite crystallographic phase. Similarly, the plate 44 may act directly on the second resilient member 54 such that the plate 44 compresses the second resilient member 54 and contacts the at least one electrical contact 38. More specifically, for embodiments which do not include the shuttle 28, the resettable sensor assembly 210 may further include the second resilient member 54 disposed in contact with the plate 44. That is, the second resilient member 54 may be a bias spring and may abut the plate 44. In particular, the second resilient member 54 may translate the plate 44 along the longitudinal axis 16 in the second direction 56 that is opposite the first direction 52 as the actuator element 46 transitions from the martensite crystallographic phase to the austenite crystallographic phase. Therefore, as the shape memory alloy cools, the second resilient member 54 may push the plate 44 in the second direction 56, e.g., away from the housing 36, to thereby reset the resettable sensor assembly 210 to an initial or default position.

Figure 7:
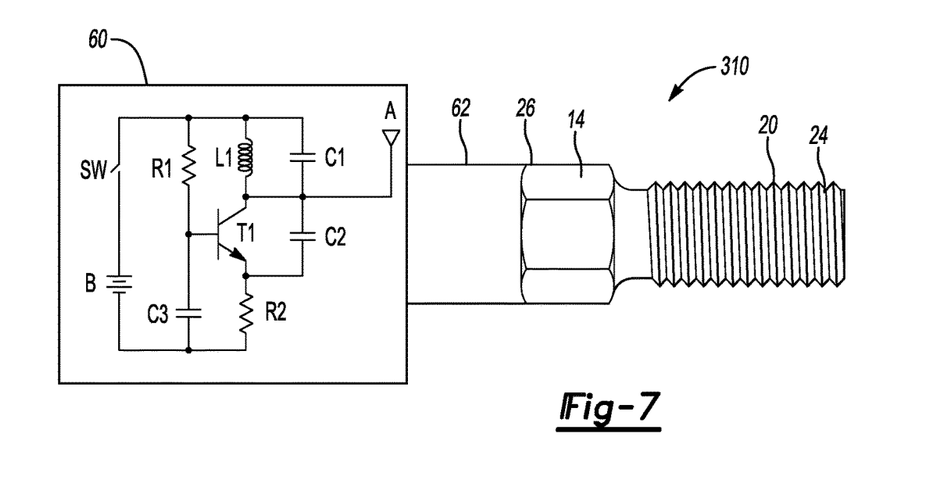
FIG. 7 is a schematic illustration of an additional embodiment of the resettable sensor assembly of FIGS. 1-6.

As described with reference to FIG. 7, the resettable sensor assembly 310 may operate wirelessly. For example, the resettable sensor assembly 310 may further include a wireless transmitter 60 electrically connected to the at least one electrical contact 38 and a battery 62 electrically connected to the wireless transmitter 60. For example, the wireless transmitter 60 may be an oscillator as shown in FIG. 7. Activation of the shape memory alloy may power the oscillator on and off. When the oscillator is off, no power may be necessary for signal transmission. The signal may be received by a receiver that is tuned to a frequency that is the same frequency as the oscillator. That is, the wireless transmitter 60 may have the same frequency as the receiver. The battery 62 may be a thermopile that may generate electricity from a temperature difference between the cavity 18 and the body 14. It is to be appreciated that other electrical circuits and/or equipment may be employed for wireless communication. For example, the resettable sensor assembly 310 may operate wirelessly across networks, electrical circuits, devices, and software associated with Bluetooth® technology, wi-fi technology, ZigBee® technology, and the like.

Referring now to FIG. 8, a resettable sensor system 12 includes the resettable sensor assembly 10, 110, 210, 310, 410 and the member 22. The member 22 may be any suitable device which requires temperature measurement and/or condition monitoring. For example, the member 22 may be, by way of non-limiting examples, a component of a gear box, a transmission, a fluid reservoir, a conduit, an engine, an axle, a oil pan, a coolant pipe, a brake caliper, and the like. However, the member 22 may also be useful for non-vehicular devices such as heating equipment, e.g., ovens, dryers, grinders, and the like; electrically-powered equipment, e.g., electric motors, timer switches, welding transformers, and welding guns; mechanical equipment, e.g., pulleys, elevators, and augers; and processing equipment, e.g., reactors, ovens, coolant pipes, conduits, valves, and conveyors.

The member 22 defines a hole 64 therein and includes a second plurality of threads 120 matable with the first plurality of threads 20 to thereby seat the resettable sensor assembly 10 within the hole 64. That is, the body 14 of the resettable sensor assembly 10 may be screwed or threaded into the hole 64.

The member 22 may be configured for providing the thermal activation signal 48 (FIG. 6) to the actuator element 46. That is, the member 22 may heat up and increase in temperature during operation and transfer heat to the body 14 and the actuator element 46 by way of conduction. Therefore, the resettable sensor assembly 10 may detect when a temperature excursion occurs, i.e., when an operating temperature of the member 22 exceeds or falls below the transformation temperature of the shape memory alloy.

The resettable sensor assembly 10, 110, 210, 310, 410 and resettable sensor system 12 may provide cost-effective and energy-efficient, autonomous monitoring. The resettable sensor assembly 10, 110, 210, 310, 410 and resettable sensor system 12 may provide a remote, device-specific overheat signal to warn of temperature excursions beyond or below a desired level or range. The resettable sensor assembly 10 may be located in situ on a device and may threadably attach to the member 22. The resettable sensor assembly 10, 110, 210, 310, 410 is compact and lightweight and can monitor temperature excursions of equipment having small dimensions or tight manufacturing tolerances. For example, the resettable sensor assembly 10, 110, 210, 310, 410 may have a height, sensing depth, or other dimension of from about 2 mm to about 150 mm. Therefore, the resettable sensor assembly 10, 110, 210, 310, 410 may be manufactured to a wide range of specific dimensions or sensing depths according to a desired application. As such, the resettable sensor assembly 10, 110, 210, 310, 410 is tailorable and versatile for many applications. Further, the resettable sensor assembly 10, 110, 210, 310, 410 and resettable sensor system 12 are durable and automatically resettable, provide a combined sensor and actuator, and may be tuned according to a desired temperature alarm limit.

While the best modes for carrying out the disclosure have been described in detail, those familiar with the art to which this disclosure relates will recognize various alternative designs and embodiments for practicing the disclosure within the scope of the appended claims.

The invention claimed is:

1. A resettable sensor assembly configured for monitoring a temperature of a member, the resettable sensor assembly comprising:
   a body having a longitudinal axis and defining a cavity therein, wherein the body includes a first plurality of threads disposed about the longitudinal axis;
   a housing mated to the body and including at least one electrical contact; a plate slideable towards and away from the at least one electrical contact; and
   an actuator element configured for translating the plate along the longitudinal axis between:
   a first position in which the plate contacts the at least one electrical contact thereby closing an electrical circuit; and
   a second position in which the plate is spaced apart from the at least one electrical contact thereby opening the electrical circuit;
   wherein the plate moves to the first position at a first temperature and returns to the second position at a second temperature lower than the first temperature;
   wherein the actuator element is formed from a shape memory alloy that is transitionable between an austenite crystallographic phase and a martensite crystallographic phase in response to a thermal activation signal to thereby translate the plate between the first position and the second position.

2. The resettable sensor assembly of claim 1, further including a shuttle reversibly translatable within the cavity along the longitudinal axis.

3. The resettable sensor assembly of claim 2, wherein the actuator element abuts the shuttle and the body.

4. The resettable sensor assembly of claim 2, wherein the actuator element is configured as a first resilient member.

5. The resettable sensor assembly of claim 4, further including a second resilient member disposed about and in contact with the shuttle.

6. The resettable sensor assembly of claim 5, wherein the actuator element translates the shuttle along the longitudinal axis in a first direction as the actuator element transitions from the austenite crystallographic phase to the martensite crystallographic phase.

7. The resettable sensor assembly of claim 6, wherein the second resilient member translates the shuttle along the longitudinal axis in a second direction that is opposite the first direction as the actuator element transitions from the martensite crystallographic phase to the austenite crystallographic phase.

8. The resettable sensor assembly of claim 1, wherein the housing includes a plurality of electrical contacts spaced apart from one another, and further wherein the plate is disposed in contact with the plurality of electrical contacts when the plate is disposed in the first position, and is spaced apart from the plurality of electrical contacts when the plate is disposed in the second position.

9. The resettable sensor assembly of claim 1, wherein the housing defines a chamber therein and further wherein the plurality of electrical contacts are disposed within the chamber.

10. The resettable sensor assembly of claim 8, further including a bias resilient member disposed within the chamber and configured for translating the plate away from the plurality of electrical contacts along the longitudinal axis.

11. The resettable sensor assembly of claim 1, further including:
   a wireless transmitter electrically connected to the at least one electrical contact; and
   a battery electrically connected to the wireless transmitter.

12. The resettable sensor assembly of claim 1, wherein the housing includes only one electrical contact.

13. The resettable sensor assembly of claim 12, wherein the actuator element translates the plate along the longitudinal axis in a first direction as the actuator element transitions from the austenite crystallographic phase to the martensite crystallographic phase.

14. The resettable sensor element of claim 13, further including a second resilient member disposed in contact with the plate.

15. The resettable sensor assembly of claim 14, wherein the second resilient member translates the plate along the longitudinal axis in a second direction that is opposite the first direction as the actuator element transitions from the martensite crystallographic phase to the austenite crystallographic phase.

16. A resettable sensor assembly configured for monitoring a temperature of a member, the resettable sensor assembly comprising:
   a body having a longitudinal axis and defining a cavity therein, wherein the body includes a first plurality of threads disposed about the longitudinal axis;
   a shuttle reversibly translatable within the cavity along the longitudinal axis;
   a housing mated to the body and including at least one electrical contact;
   a plate slideable towards and away from the at least one electrical contact; and
   an actuator element configured for translating the shuttle along the longitudinal axis between:
   a first position in which the plate contacts the at least one electrical contact thereby closing an electrical circuit; and
   a second position in which the plate is spaced apart from the at least one electrical contact thereby opening the electrical circuit;
   wherein the plate moves to the first position at a first temperature and returns to the second position at a second temperature lower than the first temperature;
   wherein the actuator element is disposed in contact with and about the shuttle along the longitudinal axis and is formed from a shape memory alloy that is transitionable between an austenite crystallographic phase and a martensite crystallographic phase in response to a thermal activation signal to thereby translate the shuttle between the first position and the second position.

17. The resettable sensor assembly of claim 16, wherein the housing defines a chamber therein and further wherein the at least one electrical contact is disposed within the chamber.

18. The resettable sensor assembly of claim 17, further including a bias resilient member disposed within the chamber and configured for translating the plate away from the at least one electrical contact along the longitudinal axis.

19. The resettable sensor assembly of claim 16, wherein the housing includes a plurality of electrical contacts spaced apart from one another, and further wherein the plate is disposed in contact with the plurality of electrical contacts when the shuttle is disposed in the first position, and is spaced apart from the plurality of electrical contacts when the shuttle is disposed in the second position.

20. A resettable sensor system comprising:
a member defining a hole therein; and
a resettable sensor assembly seated within the hole and configured for monitoring a temperature of the member, the resettable sensor assembly including:
a body having a longitudinal axis and defining a cavity therein, wherein the body includes a first plurality of threads disposed about the longitudinal axis;
a housing mated to the body and including at least one electrical contact;
a plate slideable towards and away from the at least one electrical contact; and
an actuator element configured for translating the plate along the longitudinal axis between:
a first position in which the plate contacts the at least one electrical contact thereby closing an electrical circuit; and
a second position in which the plate is spaced apart from the at least one electrical contact thereby opening the electrical circuit;
wherein the plate moves to the first position at a first temperature and returns to the second position at a second temperature lower than the first temperature;
wherein the actuator element is formed from a shape memory alloy that is transitionable between an austenite crystallographic phase and a martensite crystallographic phase in response to a thermal activation signal to thereby translate the plate between the first position and the second position; and
wherein the member and includes a second plurality of threads matable with the first plurality of threads to thereby seat the resettable sensor assembly within the hole, and wherein the member is configured for providing the thermal activation signal to the actuator element.

* * * * *